United States Patent [19]

Snyder et al.

[11] Patent Number: 4,489,562
[45] Date of Patent: Dec. 25, 1984

[54] METHOD AND APPARATUS FOR CONTROLLING A GASIFIER

[75] Inventors: Troxell K. Snyder, South Windsor; Paul H. Chase, East Granby, both of Conn.

[73] Assignee: Combustion Engineering, Inc., Windsor, Conn.

[21] Appl. No.: 439,969

[22] Filed: Nov. 8, 1982

[51] Int. Cl.³ ............................ F22D 5/28; G05B 1/00
[52] U.S. Cl. ............................................ 60/667; 48/61; 48/86 R; 48/197 R; 48/DIG. 10; 60/664; 60/39.12
[58] Field of Search ................. 60/39.12, 39.182, 648, 60/664, 665, 667; 48/197 R, 202, 86, 87, 61, 62 R, 77, DIG. 10; 290/40 R; 422/62

[56] References Cited
U.S. PATENT DOCUMENTS

| | | | |
|---|---|---|---|
| 4,049,971 | 9/1977 | le Febve de Vivy | 290/40 R |
| 4,064,698 | 12/1977 | Stern | 60/664 |
| 4,086,758 | 5/1978 | Harboe | 69/39.182 X |
| 4,099,374 | 7/1978 | Foster-Pegg | 60/39.12 |
| 4,168,956 | 9/1979 | Blaskowski | 48/197 R |

*Primary Examiner*—Jay H. Woo
*Assistant Examiner*—Joye L. Woodard
*Attorney, Agent, or Firm*—Troxell K. Snyder

[57] ABSTRACT

Fuel and oxidant feed rates into a gasifier 202 are regulated by monitoring overall output 14 and comparing with a pre-selected setpoint valve 10. An overall load demand signal 50, responsive to this comparision is generated and used as an input to control 102 oxidant feed rate. The heating value of the product gas is measured 76 and used to control 64 overall fuel feed rate to the gasifier 202. For a two stage slagging gasifier, the present invention controls 114 fuel feed rate to the slagging stage 210 responsive to the measured slagging stage reaction temperature 128.

10 Claims, 3 Drawing Figures

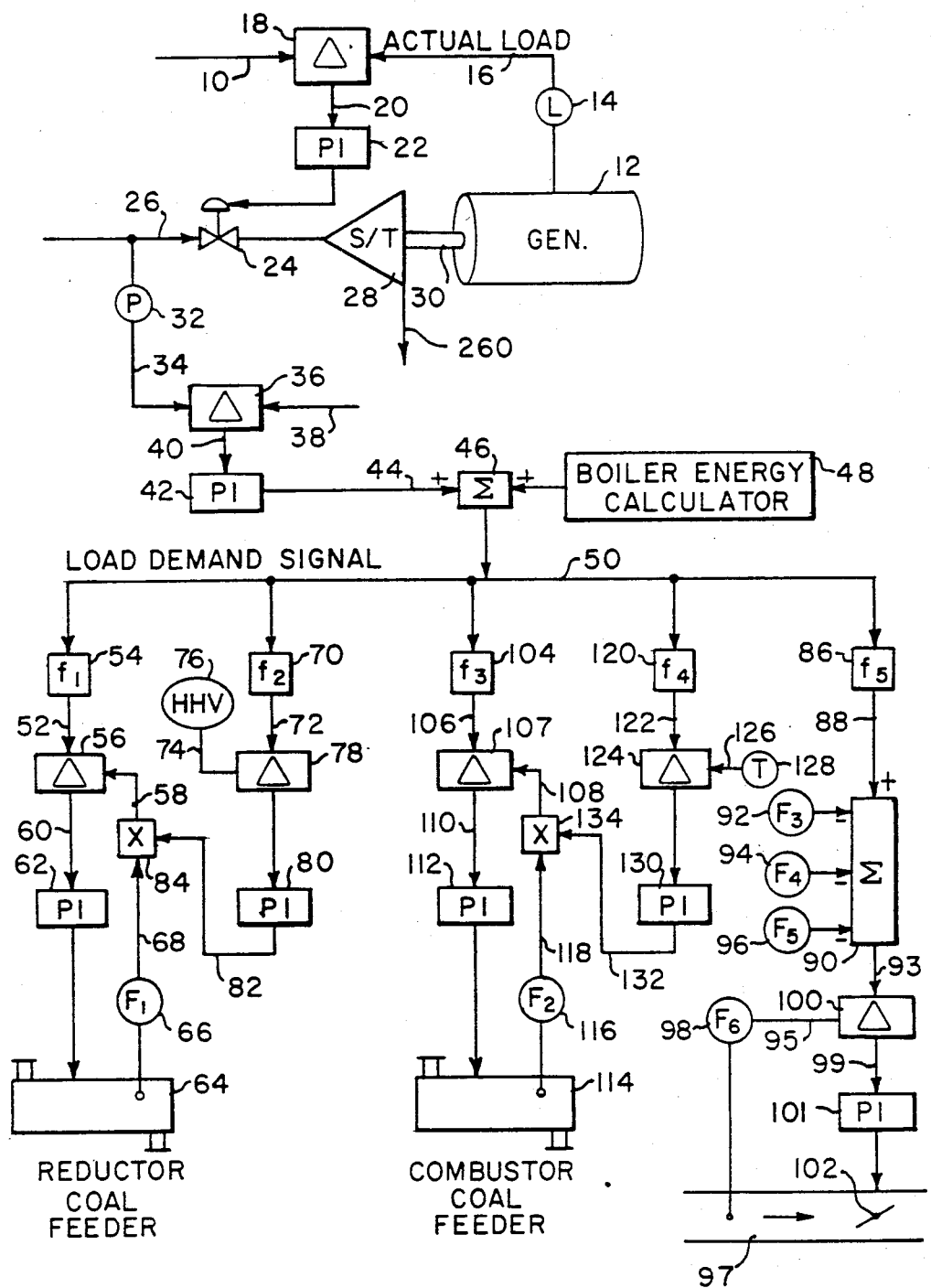
F I G. 1

METHOD AND APPARATUS FOR CONTROLLING A GASIFIER

FIELD OF THE INVENTION

This invention pertains to a method and apparatus for controlling a gasifier and, more particularly, to a method and apparatus for regulating the flow of fuel and the flow of oxidant into a gasifier producing a fuel gas.

BACKGROUND OF THE INVENTION

The gasification of various fossil fuels, especially solid carbonaceous fuels such as coal, has received much attention in recent years as an alternative to the direct combustion of fossil fuels. In these systems, fuel and oxidant are reacted substoichiometrically in a vessel to produce a product fuel gas containing carbon monoxide, CO, and hydrogen, $H_2$. This fuel gas, after the removal of unreacted or inert particulate and any sulfur bearing compounds which may also have been produced in the gasification reaction, can be used in a variety of processess which require a clean burning fuel.

One particular use of gasification technology is projected in the electric generating industry. A gasifier supplying clean product gas to a combined cycle electric generation plant may achieve overall energy conversion efficiencies up to ten percentage points higher than conventional electric power generating plants employing high pressure steam in a Rankine cycle.

In an advanced combined cycle generation plant a solid fuel, such as coal, would be gasified with an oxidant, such as air or oxygen, to form a product gas rich in CO and $H_2$. This product gas would be cleaned of possible entrained particulates and sulfur compounds and used as fuel for the combustor of a gas turbine generator set. The high temperature exhaust from the gas turbine outlet, composed of the products of combustion of the product fuel gas and air, would then be routed to a heat recovery boiler for the generation of high pressure steam. The steam thus generated, in addition to any steam which may have been raised in the gasification or gas cleanup processes, would be used in a conventional steam turbine cycle to generate additional electric power.

It is desirable for large electric generating plants in general to operate by means of automatic control systems which seek to optimize plant performance and plant safety. A gasification combined cycle electric generating plant as described above would preferably have such automatic controls to regulate the flow of input materials and output power. In particular, modern electric utilities rely on remote dispatch of a number of generating facilities whereby the desired output of each generating plant in the utility grid is determined and the information sent to each plant operator. Depending on consumer demand and economic factors, the desired load for a particular plant may vary throughout the operating day, requiring plant output to respond in an accurate and timely fashion.

In addition to the changing load demands placed upon a plant by the utility dispatcher, the automatic control system must also compensate for variations in plant performance caused by expected but unpredictable factors. These variations may be induced by a change in coal heating value, which may vary up to ten percent from a given value depending on what section of the coal mine or coal pile it was taken, changes in equipment performance caused by deterioration, maintenance, fouling, etc., or any other variation of individual equipment output which may effect overall plant performance.

Modern electric generating stations use automatic controls of the feedback type wherein plant output is measured and used to modify feed inputs in order to maintain desired electrical output. In a conventional steam electric generating plant the actual electric output is compared against the electric output desired by the dispatcher and fuel feed rate into the combustion furnace is regulated to match the actual and desired outputs. Air flow to the combustion furnace is regulated based on the amount of $O_2$ present in the combustion products from the furnace, typically in the range of two to ten percent by volume. As long as air flow is maintained at a rate greater than the stoichiometric requirement of the fuel currently being fed, the amount of energy released within the combustion furnace will be equal to the chemical energy present in the fuel. Since the energy released within the combustion furnace is directly related to the steam energy produced by the furnace and associated heat recovery equipment, the regulation of fuel feed directly affects the electric power output, thus making the system responsive and well behaved in a control sense.

In the case of a coal gasifier combined cycle electric generating plant, however, this method of control does not provide the same advantageous results due to a number of fundamental differences between the two systems. First, the coal gasification combined cycle plant does not have products of combustion until after the combustion of the product gas in the gas turbine combustor or, alternatively, in a combustion furnace downstream of the product gas cleanup equipment.

The rate of oxidant feed to the gasifier is a factor in the product gas heating value and must be accurately regulated for overall cycle efficiency and safety. Should the fuel to oxidant feed ratio fall too low, a poor quality gas will be produced and excessive chemical energy released within the gasifier, resulting in inefficient generation of power and overloading of the gas cleanup equipment. A deficiency of oxidant within the gasifier will likewise cause inefficiency in the form of incomplete gasification and/or the production of unwanted hydrocarbons and unreacted carbon particles. A typical fuel to oxidant ratio is 0.2 for coal fuel and air oxidant.

The use of plant output as a basis for regulating fuel feed to the gasifier is also unsuitable due to the particular nature of the gasification reactions which take place therein. Since in a gasifier the fuel is being reacted under substoichiometric conditions, an increase in fuel feed without a concurrent increase in oxidant flow will not immediately produce an increased energy release within the gasifier. In fact, owing to the particular nature of substiochiometric combustion, the electric generating plant will actually experience an immediate decrease of power output following a unilateral increase in fuel feed to the gasifier.

This decrease results from the inverse relationship of coal feed to reaction temperature under substoichiometric conditions, thus causing a decrease in heat absorption in the downstream product gas heat absorption equipment. The increased gas heating value resulting from the increased coal to oxidant feed ratio will eventually reach the downstream gas turbine or combustion furnace thus resulting in increased plant output. With present designs of gasification combined cycle generating plants, however, this delay could be up to ninety seconds or longer. A conventional control system which attempts to regulate gasifier fuel feed based on plant electrical output would therefore require a large amount of damping or delay in order to remain stable.

Currently operating gasifier systems are of the demonstration or test variety and have not been required to function under utility generating plant conditions. In particular, for test gasifier systems, fuel and oxidant feed rates must be varied over a wide range for the purposes of evaluating the gasification process. This is usually accomplished by measuring the inputs to the gasifier by means of gravimetric feeders for the fuel and calibrated orfices for the oxidant and then measuring output gas flow rate and heating value to arrive at an overall system heat balance. With the accurate instrumentation and the concentration of technical personnel generally present on such test or demonstration gasification systems, it is unnecessary to rely on feedback control systems to regulate gasifier operation.

In a large electric generating system employing a gasification process this method would be unsuitable both from a manpower and from a control standpoint. Electric generating plants are subject to one overriding demand, the production of the proper amount of electric power for the generating grid. It is true that the feed rates of fuel and air have an effect on the efficiency with which the fuel is converted into electric power, but this is of secondary importance with regard to the need for the plant to quickly and accurately respond to the utility demand for power.

What is needed is a simple, effective system for regulating the flow of fuel and oxidant into a gasifier which is particularly suited to the unique nature of the gasification process and which is compatible with the realities of utility electric power generation.

SUMMARY OF THE PRESENT INVENTION

The present invention provides a method and an apparatus particularly suited for controlling a gasifier in a utility electric generating environment. The method according to the present invention does not require accurate measurement of the input fuel or air flow rate, adjusting these variables by means of feedback control loops which are responsive to gasifier output parameters.

In the preferred embodiment, the gasifier is a part of a combined cycle electric generating plant and the fuel to be gasified is carbonaceous material such as coal. The heating value of the product gas currently being produced by the gasifier is measured and compared against a desired value. Based on the results of this comparison, the feed rate of coal into the gasifier is regulated. Additionally, gasifier total energy output is also measured and compared against a desired value thereof. The results of this comparison are used to regulate oxidant flow into the gasifier.

This system enables the gasification combined cycle plant to respond quickly to changes in the required plant electrical output and to easily accommodate variations in coal heating value or internal energy storage rates. The system is uniquely adapted for use in a gasification system, especially one with a large amount of unknown internal gas or other energy storage.

When used in conjunction with a two stage slagging gasification process, the present invention also provides a method and apparatus for controlling the feed rate of fuel between the first and second stages of the gasifier thus permitting effective control of the slagging process present within the first stage and the gasification reactions which take place within the second stage.

The apparatus in accordance with the preferred embodiment of the present invention generates a load demand signal to input a series of function generators which generate desired gasifier performance parameter values for gasifier energy output and product gas heating value. These values are then compared with actual measurements of gasifier output and used to generate error signals. Means, responsive to these error signals, are provided to adjust the oxidant feed rate and the fuel feed rate to compensate for any difference in the actual and the desired gasifier output parameters.

BRIEF DESCRIPTION OF THE DRAWINGS

FIG. 1 shows a schematic representation of the apparatus according to the present invention.

DESCRIPTION OF THE PREFERRED EMBODIMENT

Figure 2:
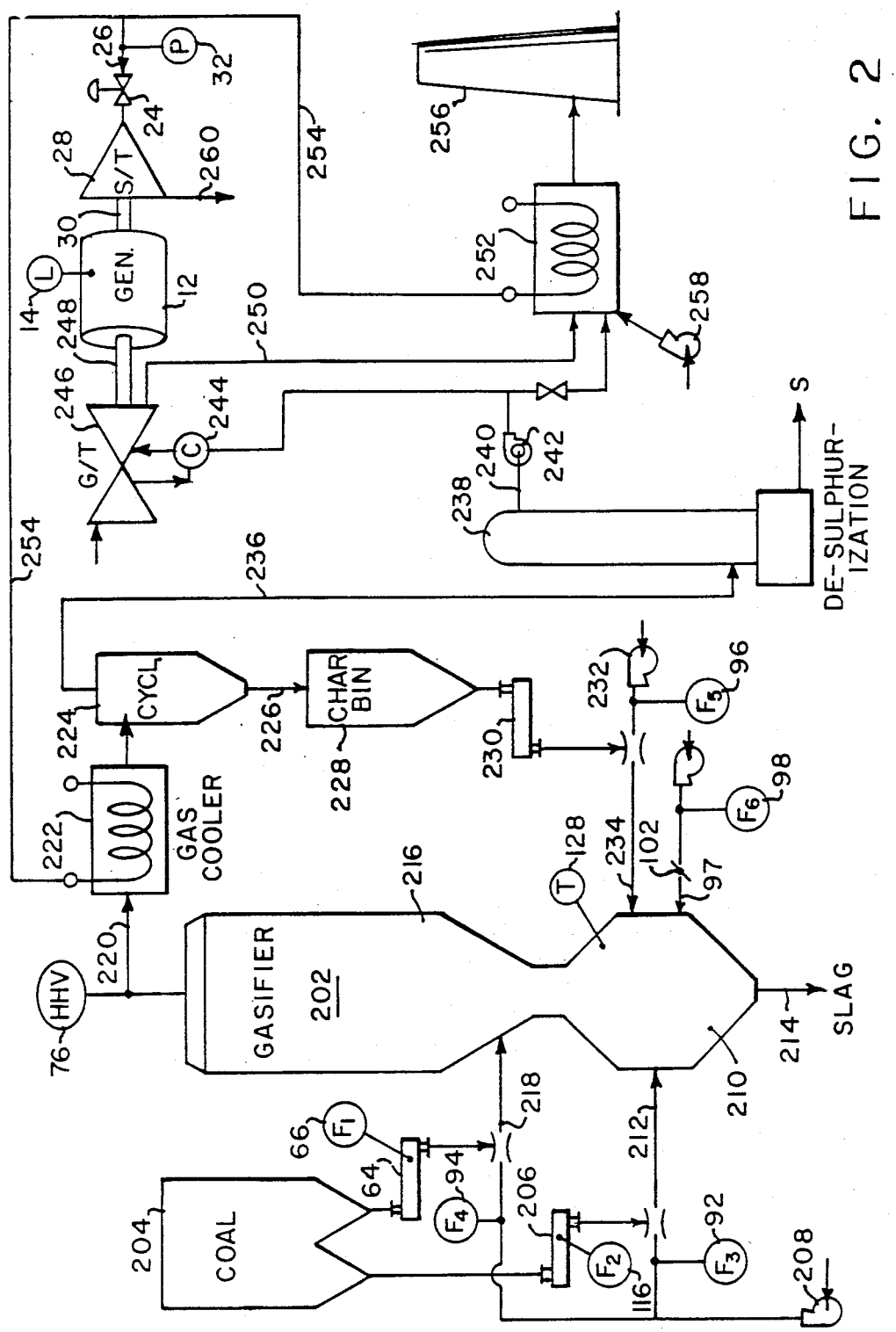
FIG. 2 shows a schematic representation of a gasifier combined cycle electric generating plant with the location of various control element sensors indicated thereon.

Referring to FIG. 1 of the appended drawings, the preferred configuration of the apparatus according to the present invention will now be discussed. It is to be understood that this embodiment is only one form of the apparatus for carrying out the method according to the present invention and should be interpreted in an illustrutive rather than a limiting sense. The schematic representation of the apparatus as shown in FIG. 1 uses standard electric analog control element representations, but could also be carried out using pneumatic, digital, or other control system elements.

As with any large utility electric generating plant, control begins with a predetermined electric power setpoint 10 determined by the electric utility grid dispatcher or the local plant operator. In the preferred embodiment the output of electric generator 12 is sensed by load sensing element 14 which generates a signal 16 commensurate with the electric power output of the generator thus measured. The setpoint 10 and the output signal 16 are compared 18 in a differential analyzer which generates a power error signal 20. The error signal 20 enters a proportional integral controller 22 which acts upon the main steam throttle 24 thus regulating the flow of steam in the steam line 26 into the steam turbine 28. The steam turbine 28 drives the generator 12 by mechanical means such as a shaft 30.

The variation of the opening of the main steam throttle 24 causes a variation in the static pressure in the main steam line 26 upstream of the throttle valve 24. In a typical steam electric power plant the upstream temperature is regulated by the temperating sprays and temperature control loops (not shown) at a constant, preselected level. In such a system, it is desirable to control upstream throttle pressure to a preselected level for optimum plant performance. This is accomplished in the preferred embodiment by means of a pressure sensing element 32 which generates a signal 34 commensurate with the pressure thus measured. This signal 34 is compared 36 with a predetermined pressure setpoint 38 for the generation of a pressure error signal 40. The pressure setpoint 38 may be either a fixed or a variable value over the control load range of the electric generating plant, depending on the design of the steam generator and associated equipment.

The pressure error signal 40 enters a proportional integral controller 42 for the generation of an output signal 44. The output signal 44 enters an optional summer 46, the output of which is the load demand signal 50. The optional summer 46 and optional boiler energy calculator 48 provide a feed forward signal to the control system to provide quick response to changes in desired steam generator output. The boiler energy calculator 48 measures temperature and flow rates of steam and feed water entering and leaving the steam generator and computes an alternative total energy output level signal.

The load demand signal 50 is proportional to the required total energy output of the gasifier and is used as an input to control fuel and oxidant feed into the gasifier. As a result of the apparatus discussed above, the load demand signal 50 is an adjusted signal designed to compensate for any differences in the actual plant electrical output as represented by the power output signal 16 and the preselected load setpoint 10.

Figure 3:
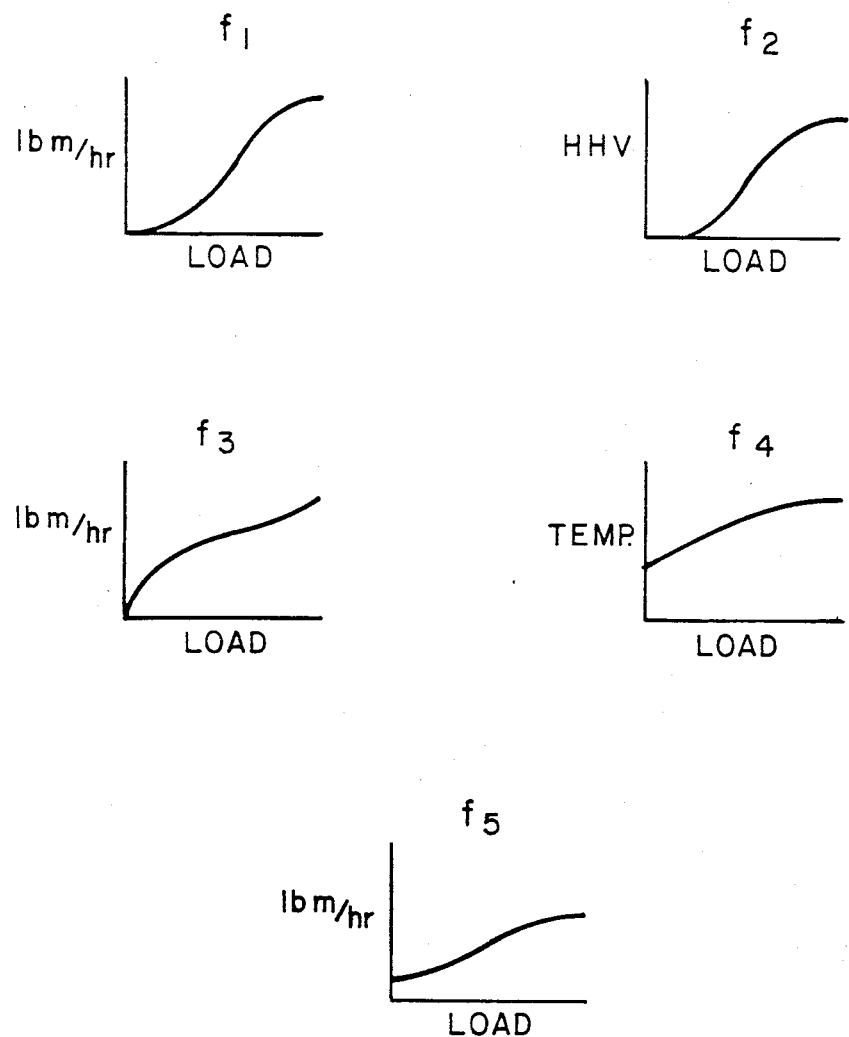
FIG. 3 shows a typical representation of the output of the function blocks for a typical gasifier system.

The load demand signal 50 enters a plurality of function generators 54,70,104,120,86 which generate desired gasifier operating parameters over the load range based on prior computer modeling or operating experience with the particular gasifier system being controlled. Each function block and equipment control loop associated therewith will be discussed in turn below. Qualitative representations of the output of the various function generator blocks are shown in FIG. 3, however it should be noted that the actual shape and magnitude of the function generator block outputs will vary not only between different gasifier systems but between different individual gasifiers based on sizing and other design variations. It is to be understood that this disclosure is meant to encompass not only nonlinear outputs from these function generator blocks, but also linear or proportional outputs therefrom.

Gasifier fuel feed is regulated by first generating a fuel demand signal 52 by means of a function generator block 54. This fuel demand signal 52 is compared 56 with a modified fuel flow signal 58 to generated a fuel flow error signal 60. This error signal 60 enters a proportional integral controller 62 which regulates the fuel feeder 64. This fuel feeder 64 is adapted to the particular type of fuel being fed to the gasifier and is of a type responsive to the output of proportional integral controller 62.

Flow sensor 66 monitors the output and parameters of fuel feeder 64 to generate a signal 68 commensurate with the current rate of fuel being feed. The parameters thus monitored would depend upon the type of fuel and feeder employed and need only give a qualitative estimation of the current rate of fuel feed. By way of example, a solid fuel feeder using a rotating screw to regulate the flow of solid granulated fuel would have the rate of revolution of the screw as the output parameter relating to fuel feed rate, while a liquid fuel feeder using a pump or a valve to transport the fuel into the gasifier would use pump speed or valve position as an indication of qualitative fuel flow rate.

Variations in the specific density or energy content of the fuel currently being fed to the gasifier require some additional other form of control to regulate fuel feed into the gasifier, as discussed in the background section in this specification. According to the present invention, the load demand signal 50 will enter a function generator block 70 for the generation of a signal 72 commensurate with the desired product gas heating value. This desired heating value signal 72 is compared 78 with a signal 74 commensurate with the actual product gas heating value as measured by heating value monitor 76. The monitor 76 may be any of a variety of automatic monitoring devices such as a continuous calorimeter or a gas analyzer. The result of the comparison 78 enters a proportional integral controller 80 to generate a heating value correction signal 82. This correction signal 82, in the preferred embodiment, enters a multiplier block 84 along with the fuel flow signal 68. The output of this block is the modified fuel flow signal 58 thus forming a feed back loop for the control of the fuel feed rate.

The apparatus thus herein disclosed allows the fuel feeder 64 to respond quickly to changes in the overall load demand signal 50 as well as variations in product gas heating value as sensed by heating value monitor 76. In the preferred embodiment the desired product gas heating value is a function of the current gasifier output level as determined by mathematical modeling or operating experience. This desired heating value would be optimized for the gasifier system and associated components over the load range of the electric generating plant.

Oxidant flow to the gasifier is controlled by means of a function generator block 86 which generates an overall oxidant flow demand signal 88 based on the load demand signal 50. The oxidant demand signal 88 next optionally enters summer 90 along with signals commensurate with the flow rate other oxidants entering the gasifier as measured by flow elements 92,94,96. The oxidant flows measured by these other elements 92,94,96 would typically be those oxidant flows such as transport air, instrument air, and other relatively minor oxidant flows whose rate of flow depends on other considerations than the overall plant control. By subtracting the signals produced by these flow elements 92,94,96 from the overall oxidant flow demand signal 88 in summer 90 as shown in FIG. 1, an oxidant control demand signal 93 is produced commensurate with the desired flow rate of the controlled oxidant flow stream. This signal 93 is compared 100 with a signal 95 commensurate with the actual flow rate of oxidant in the oxidant flow stream 97 as measured by the oxidant flow element sensor 98. The result of this comparison is an oxidant flow error signal 99 which enters a proportional integral controller 101. The output of this controller 101 operates a means 102 for regulating the flow of oxidant into the gasifier, such as a damper as shown in FIG. 1.

The apparatus as disclosed above is thus suitable for controlling a single stage gasifier system wherein the fuel and oxidant are mixed in the gasifier for producing a product heating gas. As can be appreciated from the above discussion and the accompanying schematic figures, the feed rate of oxidant to the gasifier is responsive directly to the load demand signal 50 as determined from the overall gasifier output based on of the plant electrical output and the main steam pressure. Fuel flow rate, although responsive to the load demand signal 50, is primarily controlled by the comparison of the actual product gas heating value with the desired product gas heating value. It should be pointed out again at this point that this method of control is at a variance with the typical methods used in the prior art utility boilers wherein fuel feed rate would respond directly to a load demand signal and oxidant feed rate would be controlled primarily by analysis of the downstream products of combustion.

It is now appropriate to turn to FIG. 2 for a discussion of a typical gasifier combined cycle plant layout as shown in the schematic representation therein. It is to be understood that although the schematic of FIG. 2 shows a two stage gasifier integrated with a gas turbine/steam turbine electric generating cycle, the present invention is also applicable to single stage gasification systems and noncombined cycle plant configurations.

The gasifier 202 is shown receiving a solid fuel, such as coal, from coal bin 204 by means of a coal system having reductor coal feeder 64 and combustor coal feeder 206. Coal is transported from the output of the coal feeders 64,206 by air provided by the coal primary air fan 208. This transport air is measured by flow sensors 92,94. A two stage gasifier 202 of the slagging variety contains a first stage 210 which receives a first portion of the fuel 212 and air 97. The temperature within this first stage 210 is maintained preferably at a level such that the inert ash compounds typically present in the coal are maintained in a liquid state thus permitting their removal as slag 214 from the lower portion of the first stage 210.

The hot gases generated in the first stage exit upwardly into the second stage 216 of the gasifier vessel and receive a second portion of the fuel 218. This upper, second stage, also known as the reductor, allows gasification of the coal in a temperature range wherein the inert ash compounds are maintained in a solid state. The product fuel gas thus produced and any unreacted carbon or ash compounds still present exit the gasifier 202 upwardly as a raw product gas flow stream 220. In this typical gasifier system, the raw product gas 220 is cooled in a gas cooler 222 and enters particulate removal system 224.

The removed particulate stream 226, also known as char, may be optionally diverted for disposal or returned to the gasifier via the depicted char bin 228, the char feeder 230, and the char transport system 232,234.

This char is another source of possible energy storage unpredictability within the gasifier system. Since the char feed rate must be varied to avoid emptying or overfilling the char bin 228, and since the specific energy content of the char will change over the gasifier load range, the energy content of the char stream 234 can be expected to change unpredictably. These changes are easily accommodated by the control method according to the present invention, which would quickly sense the change in product gas heating value and compensate by adjusting the reductor fuel feeder 64.

The particulate free product fuel gas stream 236 next enters a desulfurization system 238 for the removal of any sulfur compounds which may be present as a result of the inherent sulfur content of coal. The cleaned product fuel gas 240 exiting the desulfurization system 238 may be urged along by induced draft fan 242 and routed optionally to the combustor 244 of the gas turbine set 246. The mechanical output 248 of the gas turbine set 246 is used to drive the generator 12 for producing electric power. The hot exhaust gas stream 250 from the gas turbine generator set is routed to a waste heat recovery boiler 252 for the additional generation of steam 254. The cooled products of combustion exit through stack 256 to the environment.

The cleaned product fuel gas 240 may also directly enter the waste heat recovery boiler 252 for oxidation with air provided by the forced draft fan 258. In the case of a retrofit application, wherein the cleaned product fuel gas is used to power an existing combustion furnace, there would be no gas turbine generator set and the entire stream of cleaned product fuel gas 240 would be routed directly to the existing combustion furnace or steam generator 252. There have also been gasification combined cycle generating plant systems proposed wherein a portion of the cleaned product fuel gas 240 is combusted in a gas turbine combustor 244 and the remaining portion is combusted in a heat recovery boiler 252. These systems are generally restricted to low-BTU gasification systems but may be applicable to other gasification systems depending on the load requirement and operating environment.

Steam 254 generated in the gas cooler 222 and the waste heat recovery boiler 252, as well as any steam which might be raised in the walls of the gasification vessel 202 is routed to the main steam turbine throttle 24 via the main steam line 26. This steam is expanded in the steam turbine 28 whose mechanical output 30 is also used to drive the generator 12. The outlet 260 of the steam turbine 28 is routed to a conventional condenser and feed water system (not shown).

Although the system shown in FIG. 2 is a two stage gasification system, a single stage system may be visualized by removing the combustor feed train 206,212 and feeding only the remaining fuel stream 218 and oxidant stream 96 into the gasification vessel 202.

The control apparatus as disclosed up to this point functions in a single stage gasifier arrangement to provide control of the total gasifier energy output and heating value according to the present invention. A two stage gasifier will require additional control means to distribute the flow of fuel between the first and second stages 210,216 of the gasification vessel 202.

The method of distributing fuel between the stages of a two stage gasifier is best illustrated by referring again to FIG. 1 wherein the control apparatus for the first stage fuel flow will be discussed. As shown in the Figure, the load demand signal 50 enters a function generator block 140 for generating a signal 106 commensurate with desired first stage fuel feed rate. This signal is compared 107 with a modified first stage fuel flow rate feedback signal 108 to generate a first stage fuel flow rate error signal 110. This error signal 110 enters a proportional integral controller 112 which acts to control the first stage fuel feeder 114. Flow element sensor 116 senses a qualitative flow rate parameter from the feeder 114 in the same manner as discussed above for the primary fuel feeder 64.

A signal 118, commensurate with the qualitative first stage fuel flow rate is generated by the flow element 116. The function generator block 120 generates a signal 122 commensurate with the desired first stage reaction temperature. This signal 112 is compared 124 with a signal 126 commensurate with the actual first stage reaction temperarture as measured by a temperature sensor 128. The temperature sensor 128 may be any suitable type known in the art, such as infrared, indirect thermocouple, or the like. The results of this comparison enter a proportional integral controller 130 to generate a first stage reaction temperature error signal 132. A multiplier block 134 receives the error signal 132 and the first stage fuel flow rate signal 118 and generates the modified first stage fuel flow rate feedback signal 108 thus completing the first stage fuel flow control loop.

As now presented the apparatus according to the present invention will also control combustor fuel flow feed rate to maintain a desired first stage reaction temperature. Second stage fuel feed rate (and thus overall fuel flow rate) is controlled to maintain a desired product gas heating value, and overall oxidant flow rate is controlled to maintain a desired gasifier total energy output.

As noted above the individual elements shown in the schematic of FIG. 1 are only one representation of any of a number of similarly functioning hardware elements which may be used to practice the method according to the present invention. This method is best described in general terms with reference to the above disclosed preferred embodiment of the apparatus, but with regard to the flexibility inherent in the design of control system hardware.

According to the present invention, the feed rate of fuel and the feed rate of oxygen into a gasifier producing a product fuel gas is controlled by first determining a desired product gas heating value and a desired total energy output level. The desired total energy output level of the gasifier may be the result of other measurements depending upon the particular arrangement and function of the gasifier in the system. In an electric power generation setting, total gasifier output may be inferred from total plant electrical output, steam pressure, steam flow, or a combination of these or other plant output parameters. In any case, the actual total gasifier energy output level will be compared with the desired gasifier output level and employed to adjust the total oxidant flow rate into the gasifier in order to compensate for any difference therebetween.

The actual product gas heating value is also measured according to the present invention and compared with the desired product gas heating value, the results of this comparison being similarly used to adjust the feed rate of fuel into the gasifier. These desired output parameters may be generated by function generators disposed within the control apparatus to automatically generate the desired output level parameter depending on the particular operating load of the gasifier as determined by computer modeling or operational experience.

For two stage gasification systems in which slagging occurs in the first stage, the method according to the present invention uses a measurement of the first stage reaction temperature and a desired first stage reaction temperature value to control the first stage fuel feed rate. This desired first stage reaction temperature value is based on the slagging characteristics of the particular fuel being used, and would typically be in the range of 1650 to 2030K. It may also prove preferable to vary this desired first stage reaction temperature value with the actual gasifier total output in order to optimize gasifier performance.

By controlling gasifier fuel feed rate and oxidant feed rate by the method according to the present invention, a stable and responsive control system is realized. The unpredictable, but expected, variations in char and fuel heating value and load requirement are accommodated automatically. The performance of the gasifier system is continuously optimized throughout the load operating range resulting in efficient and economical gasifier operation. Both these and other advantages of the method and apparatus according to the present invention will be appreciated by one skilled in the art after reading the above disclosure and inspection of the appended claims and drawing figures.

We claim:

1. A method for controlling the feed rate of fuel and the feed rate of oxidant into a gasifier for producing a product fuel gas, wherein a portion of the energy output of said gasifier is employed to generate steam for driving a steam turbine for the production of electric power, comprising the steps of:

throttling said steam turbine to achieve a desired electrical output level;

determining a desired product gas heating value as a function of a load demand signal;

measuring the actual product gas heating value;

measuring the pressure of the unthrottled steam;

comparing the measured steam pressure with a predetermined pressure setpoint;

generating the load demand signal responsive to any difference between the measured steam pressure and the predetermined setpoint;

comparing the desired and actual product gas heating values;

adjusting the fuel feed rate into said gasifier to compensate for any difference between the measured and the actual product gas heating values;

adjusting the oxidant feed rate into said gasifier in response to the load demand signal.

2. The method of claim 1 wherein the mechanical output of said steam turbine drives an electric generator for producing electric power, further comprising the steps of:

measuring the electric power output of said electric generator;

comparing the measured electric output with the predetermined electric output setpoint; and throttling said steam turbine to compensate for any difference between the measured output and the output setpoint.

3. An apparatus for controlling the feed rate of fuel and the feed rate of oxidant into a gasifier for producing a product fuel gas, wherein a portion of the energy output of said gasifier is employed to generate steam for driving a steam turbine for producing electric power, comprising:

a throttle for regulating said steam turbine for producing a desired amount of electric power;

means for generating a signal commensurate with the desired product gas heating value in response to a load demand signal;

means for generating a signal commensurate with the actual product gas heating value;

means responsive to the desired and actual heating value signals for generating a heating value error signal;

means responsive to the heating value error signal for adjusting the fuel feed rate;

means for generating a signal commensurate with the pressure of said steam at a location upstream of said throttle;

means responsive to the pressure signal and a desired pressure setpoint for generating a pressure error signal;

means responsive to the pressure error signal for generating the load demand signal; and means responsive to the load demand signal for adjusting said oxidant feed rate.

4. The apparatus of claim 3 wherein the mechanical output of said steam turbine drives an electric generator for producing electric power, further comprising:
- means for generating a signal commensurate with the electric power output of said generator;
- means responsive to the power output signal and a predetermined power output setpoint for generating a power output error signal; and
- means responsive to the power output error signal for throttling said steam turbine.

5. A method of controlling the fuel feed rate and oxidant feed rate into a two stage slagging gasifier wherein both the oxidant and a first portion of the fuel are fed into the first, slagging stage and second portion of fuel is also fed into the second, reductor stage comprising the steps of:
- supplying a gasifier load demand signal;
- determining a desired product gas heating value responsive to the load demand signal;
- measuring the actual product gas heating value;
- determining a desired first stage reaction temperature responsive to on the load demand signal and the slagging characteristics of the fuel;
- measuring the actual first stage reaction temperature;
- adjusting the oxidant feed rate responsive to the load demand signal;
- comparing the actual and the desired first stage reaction temperatures;
- adjusting the first stage fuel feed rate to compensate for any difference between the actual and the desired temperatures;
- comparing the actual and the desired product gas heating values; and
- adjusting the second stage fuel feed rate to compensate for any difference between the actual and the desired heating values.

6. The method of claim 5, wherein a portion of the energy output of said gasifier is used to produce steam for a throttle steam turbine and wherein the step of supplying a load demand signal includes the steps of:
- measuring the pressure of the unthrottled steam;
- comparing the measured pressure with a predetermined pressure setpoint; and
- generating a load demand signal responsive to the difference the measured pressure and the predetermined pressure setpoint.

7. The method of claim 6 wherein the mechanical output of said steam turbine drives an electric generator for producing electric power, further comprising the steps of:
- measuring the electric power output of said electric generator;
- comparing the measured electric output with a predetermined electric output setpoint; and
- throttling said steam turbine to compensate for any difference between the measured output and the output setpoint.

8. Apparatus for controlling the feed rate of fuel and the feed rate of oxidant into a two stage slagging gasifier wherein the oxidant and a first portion of the fuel are feed into the first, slagging stage and a second portion of the fuel is feed into a second, reductor stage, comprising:
- means for generating a gasifier load demand signal;
- means responsive to the load demand signal for generating a signal commensurate with a desired product gas heating value;
- means for generating a signal commensurate with the actual product gas heating value;
- means responsive to the load demand signal and the slagging characteristics of said fuel for generating a signal commensurate with a desired first stage reaction temperature;
- means for generating a signal commensurate with the actual first stage reaction temperature;
- means responsive to the load demand signal for adjusting the oxidant feed rate;
- means responsive to the actual and the desired first stage reaction temperature signals for generating a temperature error signal;
- means responsive to the temperature error signal for adjusting the feed rate of said first portion of the fuel into said first stage;
- means responsive to the actual and the desired product gas heating value signals for generating a heating value error signal; and
- means responsive to the heating value error signal for adjusting the feed rate of said second portion of the fuel into said second stage.

9. The apparatus of claim 8, wherein a portion of the energy output of said gasifier is used to produce steam for a throttled steam turbine and wherein the means for generating the load demand signal further comprises:
- means for generating a signal commensurate with the pressure of said steam upstream of said throttled steam turbine;
- means responsive to the pressure signal and to a predetermined pressure setpoint for generating a pressure error signal; and
- means responsive to the pressure error signal for generating the load demand signal.

10. The apparatus of claim 9, wherein the mechanical output of said steam turbine drives an electric generator for producing electric power, further comprising:
- means for generating a signal commensurate with the electric power output of said generator;
- means responsive to the power output signal and a predetermined power output setpoint for generating a power output error signal; and
- means responsive to the power output error signal for throttling said steam turbine.

* * * * *